June 15, 1965 R. G. DEVANEY 3,189,052
THIN-WALL PLASTIC TUBING AND PROCESS OF MANUFACTURE
Filed Oct. 26, 1961
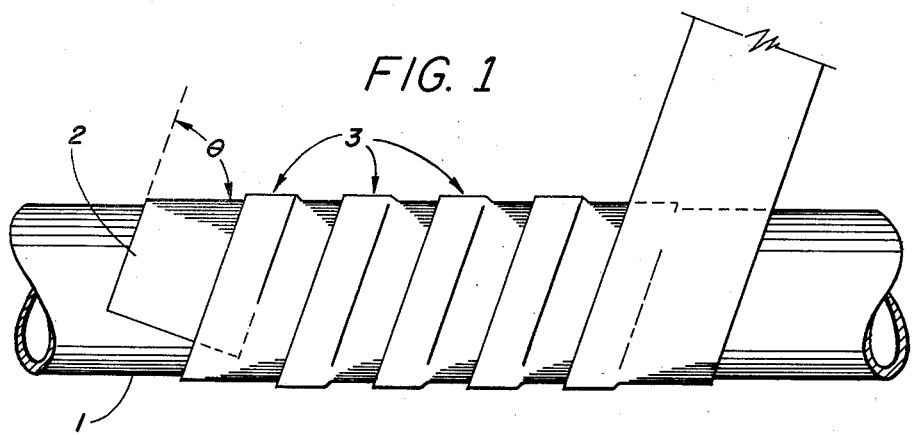
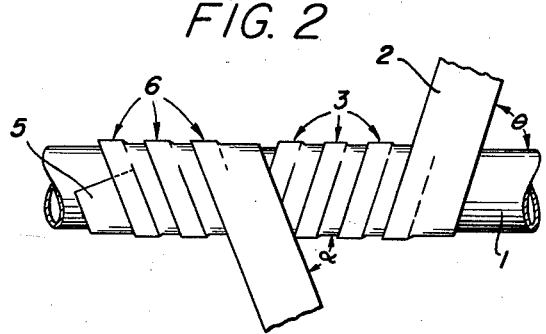
RICHARD G. DEVANEY
INVENTOR.
BY R. Frank Smith
Harold N. Powell
ATTORNEYS

3,189,052
THIN-WALL PLASTIC TUBING AND PROCESS OF MANUFACTURE

Richard G. Devaney, Kingsport, Tenn., assignor to Eastman Kodak Company, Rochester, N.Y., a corporation of New Jersey
Filed Oct. 26, 1961, Ser. No. 147,752
6 Claims. (Cl. 138—130)

This invention relates to plastic tubing and a simplified method of manufacture. More particularly this invention concerns thin-wall tubing of a particular polymeric composition rendering such tubing useful in various fields.

There are a number of places in industry where tubing of the type indicated may be used ranging from stiff tubing for pencil barrels and electrical purposes to relatively thin small diameter tubing for conducting liquids. A number of methods have been described for making such tubing. Such methods have included relatively complex procedures such as extruding fluid (molten) polymer through a die into the form of a tube, pinching the end of the tube, injecting gas into the interior of the tube to expand the tube and otherwise applying other steps to finish the tube. Also, less complex methods have been proposed comprising helically winding a ribbon of plastic sheeting onto a mandrel. Then with the aid of solvent or adhesive, heat and pressure causing the wound layers to adhere into the form of tubing which may be withdrawn from the mandrel. While the latter type method has the advantage of simplicity and requiring less costly apparatus as compared with molding machines for handling molten polymer, the requirements of using solvents, cements and pressure reduces speed of operation and contributes to complexity of manufacture. Also, the presence of additives, as cements, may be subject to extraction if the tube is conducting certain liquids thereby risking the possibility of contaminating the liquid.

It is, therefore, believed apparent that the manufacture of plastic tubing, particularly thin-walled tubing, by a simpler procedure represents a highly desirable result. After extended investigation I have found that high quality novel plastic tubing may be made in a manner which is simpler and more efficient than the procedures heretofore used.

This invention has for one object to provide a new thin-wall plastic tubing. Another object is to provide tubing of the type indicated which is of a helical construction and free of solvents, adhesive and the like. A particular object is to provide a relatively simple yet an efficient method for the manufacture of such type tubing. Other objects will appear hereinafter.

The manufacture of plastic tubing, as referred to above, has long been practiced but both the product and the method of manufacture are substantially different from those described herein. Tubes have been formed by the extrusion of molten plastic from an annular die and by the wrapping and gluing of oriented and nonoriented plastic films around a mandrel. Such tubes are characterized by one or more of the following shortcomings: (1) Relatively thick wall, usually greater than 0.010"; (2) lack of flexibility due to the thick wall; (3) lack of physical properties due to the nonoriented nature of the film; (4) a restricted useful temperature range, usually under 125° C., due to the materials themselves or to the adhesives used in bonding.

As also mentioned briefly above some types of plastic tubes have been made by helically wrapping various materials, such as polyesters, but the usual oriented and crystallized state of these materials normally is considered to preclude the use of heat as a sealing mechanism as taught in U.S. Patent 2,849,359; however, such films are excluded from many applications because they cannot be heat sealed together for the formation of closure seams, or for the production of tailored articles. These films have high and abrupt melting points so that if they are heated until they become soft they cannot be handled in the normal heat sealing manipulations. Furthermore, on resolidification they are nonoriented crystalline solids and do not possess the necessary physical properties. To circumvent these difficulties various gluing techniques have been tried but they are either ineffective, complicated or costly.

Such difficulties and shortcomings have been overcome, in accordance with my invention as will be described in detail hereinafter, in a heat sealing process which does not involve special pre-treatment of the polymer film, post-treatment, or glue. I have discovered that if the melting point is approached, but not reached, by two polymer surfaces of certain polymers held in intimate contact, then a bond is formed between the layers without detriment to the polymer's physical properties and in some cases, to be described, the physical properties are actually improved.

In the broader aspects of my invention the method employed to make thin-wall plastic tubing following the discovery of this invention is as follows: The plastic film, of suitable width and thickness, is wound around a suitable mandrel of low thermal conductivity such that the faying surfaces are in intimate contact. The mandrel and film assembly is then rapidly heated to a temperature just below the no-strength temperature of the polymer. This can be done by moving the assembly into a preset oven. The assembly is held at this temperature for a few minutes and then quenched. The tubing can then be removed from the mandrel and used. The process is simple, economical, and can be performed readily by anyone skilled in the art of tubing manufacture. Thin-wall tubing as described in this invention, below 0.010" wall thickness, permits improved insulation, reduced bulk and cost, and entirely new uses.

I have found that there are certain plastic films or sheets which have suitable properties for carrying out my invention and which may be slit into ribbons and used in making tubing. I prefer the polymeric sheet materials described in my Examples I–IV because of the advantages of chemical resistivity, good electrical properties and other properties possessed by the tubing made from such polymeric materials. These preferred polymeric materials may be made in accordance with Bell, Kibler, and Smith U.S. Patent No. 2,901,466. However, in the broader aspects of my invention other polymeric sheeting may be used.

The plastic film may be any film capable of sticking to itself under the conditions of this invention. In general it must have the physical properties and the temperature stability expected of the finished tubing. I prefer to use oriented, but not heat set, polyester type film for the ease with which it may be fabricated. It also yields the best tubing. Certain other materials, as the examples will indicate, may be used but do not give as satisfactory tubing. In general sheeting, from regenerated cellulose, cellulose ethers and the like is not utilizable.

The film is wound over some sort of a mandrel, rigid or otherwise, but preferably of low thermal conductivity. The film is usually wound in a helical fashion with some overlap greater than 0.00% and less than 100.0% but such that the accumulated film thickness is kept below 0.100" in making thin-walled tubing. In the case of polyesters I prefer to keep below 0.010" in wall thickness. The mandrel may, or may not, be removed depending upon the end use of the tubing. If tubing, per se, is wanted it will be removed but in, say, wire wrapping the desired goals will be moisture resistance and insulation in which case the tubing may be left around the mandrel (wire).

FIG. 1 illustrates, in an elementary manner, how the tubing described in this invention is made. 1 is the forming mandrel, preferably of a material with low thermal conductivity, which is shown as hollow in FIG. 1 but which may be solid if convenience so dictates. The polyester film 2 is laid against the mandrel at an angle, $\theta$, such that $\theta$ is less than 90° but more than 0°. The film is then wrapped around the mandrel and as a consequence forms an overlapping area 3. The helical winding thus formed is continued until the desired length is reached. Following the winding operation, either sequentially or at its conclusion, the mandrel and film winding are immersed in a heating medium to raise the polyester film temperature above its heat-distortion temperature, but below its "no-strength" temperature. This causes the faying inner surfaces of the overlap area 3 to bond. After a suitable time the assembly emerges from the heating medium and is cooled. After cooling, the film tubing thus formed is removed from the mandrel and is ready for use.

FIG. 2 illustrates one of many variations which are possible to build a stronger, stiffer and thicker tube. The elements of FIG. 1 are retained as 1, 2, 3 and $\theta$, and the FIG. 1 descriptions apply. Now, however, a second film 5 is wound over the first film with an opposite pitch (slant) at an angle alpha, such that alpha is less than 90° but more than 0°. Again, as in FIG. 1, overlapping areas 6 are generated as the helical wrapping continues. In addition, though, the entire inner surface of the tube formed from film 5 is in intimate contact with the entire outer surface of the tube formed from film 2. Thus, when the composite winding is immersed in the heating medium, not only are the inner faying surfaces of the overlap areas 3 and 6 bonded but the entire tubes are also bonded to each other at their common interface. The temperature employed for the heat immersion is above the heat-distortion temperature but below the "no-strength" temperature. After a suitable time, the composite assembly emerges from the heating medium and is cooled. After cooling, the tubing thus formed is removed from the mandrel and is ready for use.

In order to effect a bond between the faying surfaces by the present invention, it is necessary to raise the temperature above the second order transition temperature but at the same time keep it below the melting point. I prefer to operate above the heat distortion temperature and below the no-strength temperature. The method of heating may be any, or a combination, of several methods such as hot air, hot liquids, radiant, dielectric or others including such indirect methods as inductive heating by means of a ferro-magnetic mandrel.

No-strength (zero-strength) temperature is that temperature near the melting point virtually independent of load, where there is a sudden and irreversible elongation and loss of physical properties. It may be determined an apparatus built by the F. J. Mullowney Company, Trenton, New Jersey.

Heat distortion temperature is that temperature, reached at a linear rate as a function of time, at which an arbitrarily chosen elongation is reached for a particular load. It is a function of the load. It may be determined on apparatus such as that described in: An Autographic Apparatus for the Study of Thermal Distortion, Modern Plastic, 34, No. 3, 169 (1956) by M. T. Watson G. M. Armstrong and W. D. Kennedy.

Second order transition temperature is that temperature at which there is an abrupt discontinuity in the thermal expansion of the material For further explanation see: Thermal Expansion and Second Order Transition Effects in High Polymers Journal of Applied Physics, 15, 398 (1944), and 16, 594 (1945).

The cooling of the completed tube may take place over a wide range of rates, the slowest rate being determined by the nature of the film. Cooling or quenching may be effected by any suitable gas or liquid, or combination thereof. The completed tube may, or may not, be removed from the mandrel as mentioned above depending upon the end use.

For a further understanding of this invention, reference is made to the several examples which follow for illustrating certain specific embodiments thereof.

*Example I*

A polyester formed from the condensation of terephthalic acid, isophthalic acid and 1,4-cyclohexanedimethanol (M.P. 280°–285° C.) was formed into a cross-stretched but not heat-set film and slit into a ribbon 1 3/16" wide by 0.0005" thick. The ribbon was then wound in a helical fashion, with 50% overlay, around a 3/8" diameter Teflon tube mandrel. The ends were held captive and the whole was inserted in an air oven at 230° C. for three minutes, removed, and allowed to cool in air at 25° C. The tube thus produced was 3/8" in diameter with a wall thickness of 0.001" and the physical properties were unchanged except for the heat distortion temperature which was improved substantially.

*Example II*

The same procedure as in Example I was followed except a two-thirds overlay was used to produce a tube 0.0015" thick by 3/8" in diameter.

*Example III*

The same procedure as in Example I was followed except the tubing was quenched in 25° C. water.

*Example IV*

The same procedure as in Example I was followed except that two film layers were wound on top of each other, the helices having opposite pitches. The finished tube was then 3/8" in diameter with a wall thickness of 0.002" and was substantially stiffer than the tubing described in Examples I through III.

The tubing from the above examples, which concern utilizing the polymer I prefer, were tested in several ways as follows:

(A) Four-inch gage length specimens were clamped in a standard Model TTB Instron tester and strained at two inches per minute until break occured. When tubing was made according to the teachings herein disclosed, the break strength was about 10,000 p.s.i. and the maximum elongation was from 2.0% to 4.5%. In contrast, commercial tubing helically wound and cemented from poly (ethylene terephthalate) with an original-film break strength about 50% greater than the break strength of the polyester used in this invention, degraded to a nearly identical break strength after more than 80% elongation (caused by the tube unwinding.) However, this commercial tubing was not usable after about 1.5% elongation.

(B) Tubing made according to the teachings of this invention was also used to seal the end of a 30 p.s.i. water line. It was left under hydrostatic pressure for six weeks with no breakage or leakage.

From such tests it may be seen that such tubing compares favorably with or is better than tubing now commercially available.

*Example V*

A polyethylene terephthalate film biaxially stretched and heat-set (M.P. 245°–250° C.), 0.00025" thick, was slit to form a ribbon 1 3/16" wide. The ribbon was wound in a helical fashion, with 50% overlay, around a 3/8" diameter Teflon tube mandrel. The ends were held captive and the whole inserted in an air oven at 230° C. for six minutes. It was then removed and allowed to cool in 25° C. air. A tube 3/8" in diameter with a wall thickness of 0.0005" was produced. The physical properties appeared unchanged.

*Example VI*

Biaxially oriented polystyrene film (HDT 71° to 99° C.) 0.002" thick was slit to form a ribbon 1 3/16" wide. The ribbon was wound in a helical fashion, with 50% overlap, around a 3/8" Teflon tube mandrel. The ends were held captive and the whole inserted in an air oven at 150° C. for three minutes. It was then removed and allowed to cool in 25° C. air. A tube 3/8" in diameter with a wall thickness of 0.004" was produced.

*Example VII*

In accordance with the example a non-oriented polyester film 0.0025" thick of the composition described in Example I was used. It was slit into ribbons which were wound on a mandrel to form a tube. The tube was treated at 230° C. for three minutes. It was then removed and allowed to cool in 25° C. air. A finished tube 3/8" in diameter with a wall thickness 0.005" was produced which was crystalline but not oriented.

The particular apparatus used in carrying out the above examples and for practices in this invention, in general, is not a limitation. Various types of suitable equipment are known. For example, apparatus of the type shown in U.S. Patent No. 2,250,430 may be used except that such equipment may be further simplified. For example, the pressure rolls on the winding may be eliminated if desired. It will be kept in mind that in the present invention heat alone is sufficient and that solvents, cements, glues and pressure are unnecessary. However, the use of limited pressure rolls may be included in the apparatus if desired. In the present invention, by the choice of the polymer as described herein, the control of the heating and the like factors sufficient constriction takes place to eliminate the need of roll pressure for securing bonding.

The invention has been described in considerable detail with particular reference to certain preferred embodiments thereof, but it will be understood that variations and modifications can be effected within the spirit and scope of the invention as described hereinabove, and as defined in the appended claims.

I claim:

1. A method of manufacturing thin-walled tubing from at least one ribbon, the ribbon being characterized in that it is transparent and of a thickness of not substantially greater than 0.0020 inch and that the ribbon is essentially comprised of an oriented, nonheat-set, polyester polymer material, which comprises helically winding said ribbon on a mandrel such that the faying surfaces of the ribbon are in intimate contact, subjecting the mandrel and ribbon assembly to a heating in an ambient heating medium without substantial externally applied pressure for a few minutes at a temperature no higher than the no-strength temperature of the polyester polymer, then subjecting the assembly to a quenching, whereby a monolithic strong thin-walled tubing is obtained without the need of cement, solvent, glue or pressure positively applied greater than that inherent in the aforesaid winding.

2. The method of claim 1 wherein the mandrel is of low thermal conductivity.

3. The method of claim 1 wherein any tension in the ribbon in said winding of the ribbon is of a magnitude not substantially greater than that inherent in said winding.

4. As a new article of manufacture a thin-wall transparent tubing, the tubing being comprised of at least one ribbon of polymeric composition helically coiled so that a portion of the ribbon overlaps another portion to form a joint wherein the overlapped portions are in intimate contact, the ribbon being of a thickness not substantially exceeding 0.0020 inch and consisting essentially of a polyester polymer material and the ribbon when overlapped having oriented and nonheat-set properties the oriented properties having been obtained by longitudinal and lateral stretching of the ribbon in its preparation, the tubing having been heated to a temperature no higher than the no-strength temperature of the polyester polymer and quenched from said higher temperature down to a temperature of the order of room temperature, whereby a monolithic strong thin-walled tubing is obtained without the need of cement, solvent, glue or pressure of a magnitude not substantially greater than that inherent in said winding.

5. As a new article of manufacture a thin-walled transparent polyester tubing, the tubing being comprised of a helically coiled ribbon coiled so that portions of the ribbon overlap other portions to form a joint wherein the overlapped portions are in intimate contact, the ribbon being characterized in that it is transparent, of a thickness within the range of 0.00010 to 0.0020, and in the finished tubing it consists of a heat shrunk polyester polymer which has been heated for a few minutes at a temperature no higher than the no strength temperature of the polyester polymer and then quenched from said higher temperature to a lower temperature of the order of room temperature.

6. The product of claim 5 wherein the polymer contains the reaction products of a dicarboxylic acid and cyclohexanedimethanol.

References Cited by the Examiner
UNITED STATES PATENTS

| | | | |
|---|---|---|---|
| 893,857 | 7/08 | Lutz et al. | 138—129 |
| 986,960 | 3/11 | Anderson et al. | 138—129 |
| 2,225,026 | 12/40 | Welsh | 18—56 |
| 2,901,466 | 8/59 | Kibler et al. | 260—75 |
| 2,941,911 | 6/60 | Kumnick et al. | 18—55 |

EDWARD V. BENHAM, *Primary Examiner.*

LEWIS J. LENNY, *Examiner.*